United States Patent
Sako

(10) Patent No.: US 11,614,904 B2
(45) Date of Patent: Mar. 28, 2023

(54) PRINTING DEVICE, INFORMATION PROCESSING DEVICE, AND CONTROL METHOD AND MEDIUM FOR THE SAME

(71) Applicant: CANON KABUSHIKI KAISHA, Tokyo (JP)

(72) Inventor: Ritsuto Sako, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/510,443

(22) Filed: Oct. 26, 2021

(65) Prior Publication Data

US 2022/0147289 A1 May 12, 2022

(30) Foreign Application Priority Data

Nov. 9, 2020 (JP) .............................. JP2020-186752

(51) Int. Cl.
  *G06F 3/12* (2006.01)
  *G06F 21/33* (2013.01)
  *H04L 9/40* (2022.01)
  *G06F 21/60* (2013.01)

(52) U.S. Cl.
  CPC .......... *G06F 3/1231* (2013.01); *G06F 3/1204* (2013.01); *G06F 3/1288* (2013.01); *G06F 3/1293* (2013.01); *G06F 21/33* (2013.01); *G06F 21/608* (2013.01); *H04L 63/104* (2013.01)

(58) Field of Classification Search
  None
  See application file for complete search history.

(56) References Cited

U.S. PATENT DOCUMENTS

| 8,947,714 | B2 * | 2/2015 | Ishihara | G06F 3/1224 |
| | | | | 358/1.15 |
| 10,296,266 | B2 * | 5/2019 | Sako | G06F 3/1287 |
| 11,010,106 | B2 | 5/2021 | Sako | |
| 2019/0250865 | A1 * | 8/2019 | Takigawa | G06F 3/127 |
| 2021/0294550 | A1 | 9/2021 | Sako | |

FOREIGN PATENT DOCUMENTS

JP    2013-250915 A    12/2013

* cited by examiner

*Primary Examiner* — Frantz Bataille
(74) *Attorney, Agent, or Firm* — Venable LLP

(57) ABSTRACT

A printing system acquires device information from a printing device, transmits the device information acquired to a service providing device and registers the device information acquired, and receives registration information, from the service providing device, for the printing device registered to access the service providing device, with the registration information including an address of the cloud printing service provided by the service providing device and a signed certificate. The received registration information is transmitted to the printing device. The printing device of which the device information has been registered with the service providing device accesses the service providing device using the registration information to acquire a print job held by the service providing device and execute the acquired job.

15 Claims, 13 Drawing Sheets

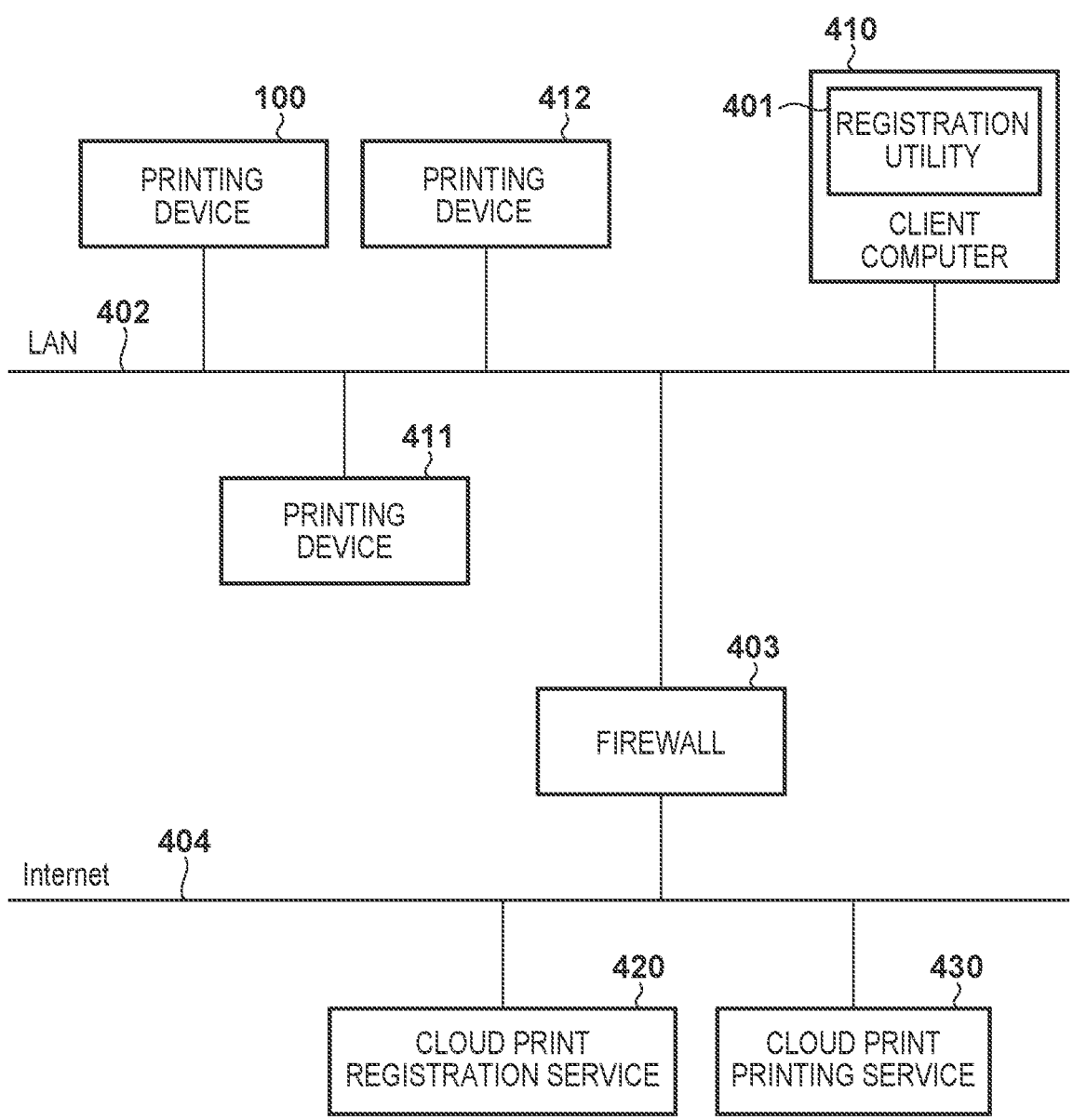

FIG. 11

| TYPE | | PROTOCOL | URI |
|---|---|---|---|
| AUTOMATIC REGISTRATION WEB SERVICE | CSR DATA PROVIDING | HTTP GET | https://[IP ADDRESS]/cloudprint/public-key |
| | CLOUD PRINT REGISTRATION INFORMATION RECEPTION | HTTP POST | https://[IP ADDRESS]/cloudprint/regist-info |
| IPP SERVICE | PRINTER INFORMATION PROVIDING | IPP get-printer-attributes | ipp://[IP ADDRESS]/ipp/print |

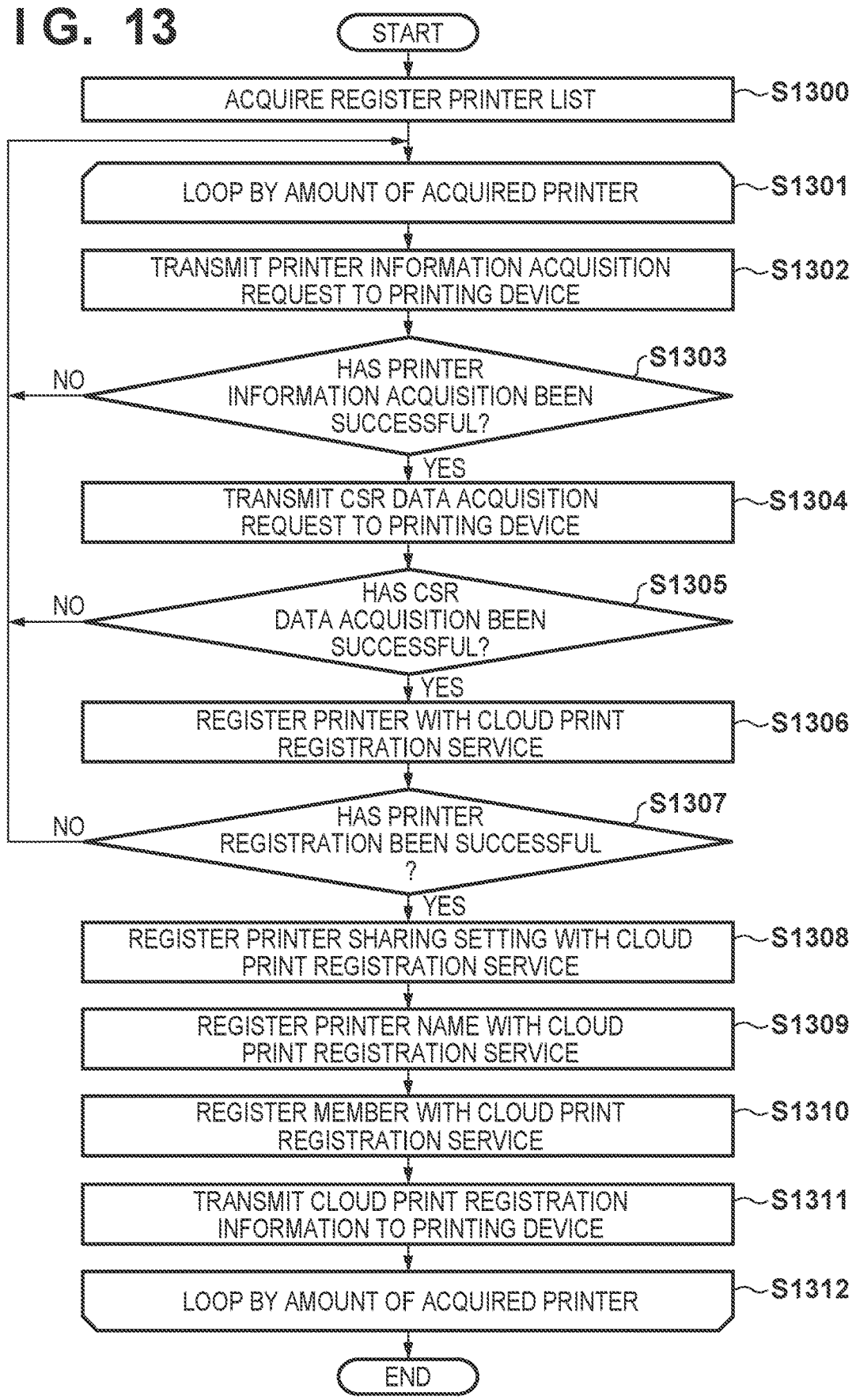

PRINTING DEVICE, INFORMATION PROCESSING DEVICE, AND CONTROL METHOD AND MEDIUM FOR THE SAME

BACKGROUND OF THE INVENTION

Field of the Invention

The present invention relates to a printing device, an information processing device, and a control method and medium for the same and particularly relates to a method of collectively registering printing devices used in a cloud-based printing service to the cloud.

Description of the Related Art

In recent years, cloud print services have been developed that use a cloud service provided on the Internet. An example of such a service is described in Japanese Patent Laid-Open No. 2013-250915.

According to Japanese Patent Laid-Open No. 2013-250915, a printing service communicates with a printer that executes printing via a network and provides a web service to a web browser of a client. This printing service receives a printer registration request from the web browser of the client and transmits a registration screen to the client. In a case where instructions are received from a client via a user operation of a registration instruction unit displayed on the registration screen, the printing service searches for a printer and transmits to the client a printer search script for responding with a search result.

The web browser executes the printer search script and searches for a printer. When a printer is found, the search result is transmitted to the printing service. The printing service, having received this, instructs the client to display the search result, and the client displays the search result.

When the user looks at the search result and instructs for a printer to be registered, this instruction is transmitted to the printing service. The printing service sends, to the client, a printer authentication ticket for the printer number and a script for instructing to access a URL for acquiring an access ticket.

The client, having received this, executes the received script and distributes the printer authentication ticket to the printer to be registered and instructs it to access the access ticket acquiring URL.

The printer, having received this, accesses the access ticket acquiring URL using the printer authentication ticket and acquires an access ticket. The printer, having acquired an access ticket, can from then on access the printing service using the access ticket.

In this manner, according to Japanese Patent Laid-Open No. 2013-250915, a plurality of printers can be collectively registered to the printing service.

However, with the technology of Japanese Patent Laid-Open No. 2013-250915, to register each one of the printers to be registered, messages are exchanged between the printer and the printing service in response to an instruction from the client. Thus, the printer needs to be provided with a program including complicated processes to register itself with the printing service. Also, a script executed by a web browser needs to be provided by the printing service. Furthermore, the printer and the printing service need to be able to communicate with each other when printer registration is executed, and registration beforehand cannot be executed by a client locally connected to the printer.

SUMMARY OF THE INVENTION

The present invention is directed at reducing the load on an image forming device and the load on a user when registering the image forming device for cloud printing. The present invention is also directed at providing an environment where a printer can be registered without the printer being connected for cloud printing.

The present invention has the following configuration. In other words, according to a first aspect of the present invention, provided is a printing system including an information processing device, a printing device, and a service providing device that provides a printing service, the information processing device comprising at least one memory that stores a set of instructions; and at least one processor that executes the instructions, the instructions, when executed, causing the information processing device to perform operations comprising: for one printing device or each one of a plurality of printing devices to be registered, acquiring device information from the printing device; transmitting the device information acquired to the service providing device and registering the device information acquired; receiving registration information, from the service providing device, for the printing device registered to access the service providing device; transmitting the registration information received to the printing device and storing the registration information received; and via the printing device registered with the service providing device, acquiring and executing a print job held by the service providing device using the registration information.

Also, according to a second aspect of the present invention, provided is an information processing device that communicates with a printing device and a service providing device, the information processing device comprising at least one memory that stores a set of instructions; and at least one processor that executes the instructions, the instructions, when executed, causing the information processing device to perform operations comprising: for one printing device or each one of a plurality of printing devices to be registered, acquiring device information from the printing device; transmitting the device information acquired to the service providing device and registering the device information acquired; receiving registration information, from the service providing device, for the printing device registered to access the service providing device; transmitting the registration information received to the printing device and storing the registration information received; and via the printing device registered with the service providing device, acquiring and executing a print job held by the service providing device using the registration information.

According to a third aspect of the present invention, provided is a printing device forming a printing system with an information processing device and a service providing device that provides a printing service, the printing device comprising at least one memory that stores a set of instructions; and at least one processor that executes the instructions, the instructions, when executed, causing the printing device to perform operations comprising: transmitting device information in response to a request from the information processing device; receiving registration information from the information processing device and storing the registration information; and via the printing device registered with the service providing device, acquiring and executing a print job held by the service providing device using the registration information.

According to the present invention, the load on an image forming device and the load on a user when registering the image forming device for cloud printing can be reduced. Also, an environment where a printer can be registered without the printer being connected for cloud printing can be provided.

Further features of the present invention will become apparent from the following description of exemplary embodiments with reference to the attached drawings.

BRIEF DESCRIPTION OF THE DRAWINGS

FIG. 4 is a network configuration diagram according to a first embodiment.

FIG. 9 is a flowchart of when a cloud print automatic registration function of a cloud print setting of the printing device according to the first embodiment is on.

FIG. 10 is a flowchart of when a cloud print automatic registration function of a cloud print setting of a printing device according to a second embodiment is on.

FIG. 11 is a diagram illustrating a specific example of a web service of the printing device according to the second embodiment.

FIG. 13 is a flowchart of when registration is executed by the registration utility according to the third embodiment.

DESCRIPTION OF THE EMBODIMENTS

Figure 1:
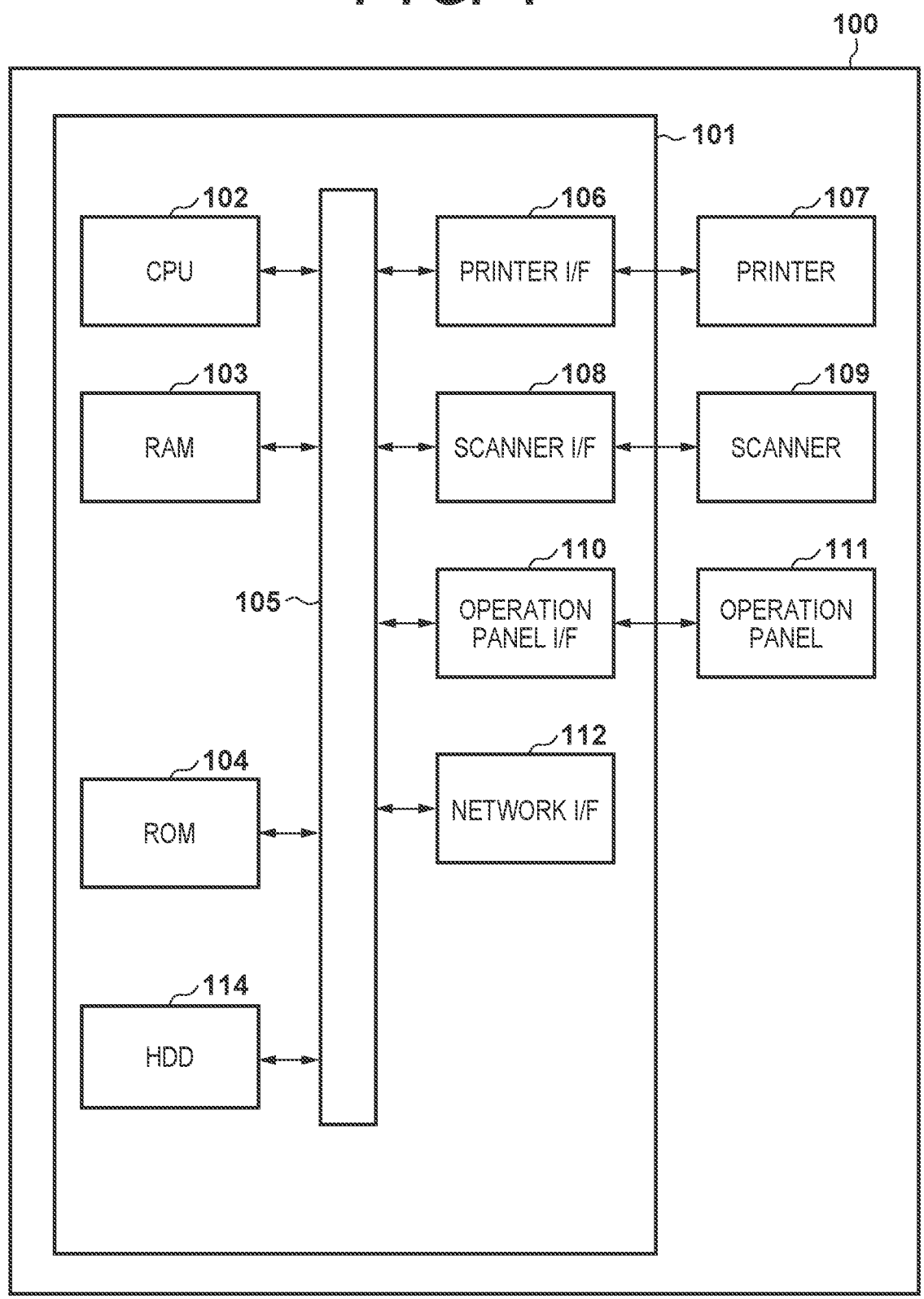
FIG. 1 is a diagram illustrating the hardware configuration of a printing device according to a present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Hardware Configuration

FIG. 1 is a block diagram illustrating the hardware configuration of a printing device 100 according to the present embodiment. The printing device 100 may also be referred to as an image forming device. In FIG. 1, a control unit 101 including a CPU 102 controls the overall operation of the printing device 100. The CPU 102 executes control of various types including communication control by reading out a control program stored in a ROM 104. A RAM 103 is used as a temporary storage area, for example, the main memory of the CPU 102, a working area, and the like. An HDD 114 stores data, various programs, and/or information tables.

A printer I/F 106 is an interface that outputs an image signal to a printer 107 (printer engine). Also, a scanner I/F 108 is an interface that inputs a read image signal from a scanner 109 (scanner engine). The CPU 102 processes the image signal input by the scanner I/F 108 and outputs this as a record image signal to the printer I/F 106.

An operation panel I/F 110 connects an operation panel 111 and the control unit 101. The operation panel 111 is provided with a liquid crystal display unit with a touch panel function, a keyboard, or the like.

A network I/F 112 transmits information to an external terminal, such as a client device, a cloud print registration service, or the like, and receives various information from the external devices, and the like. The blocks in the control unit 101 are connected via a system bus 105.

Software Configuration

Figure 2:
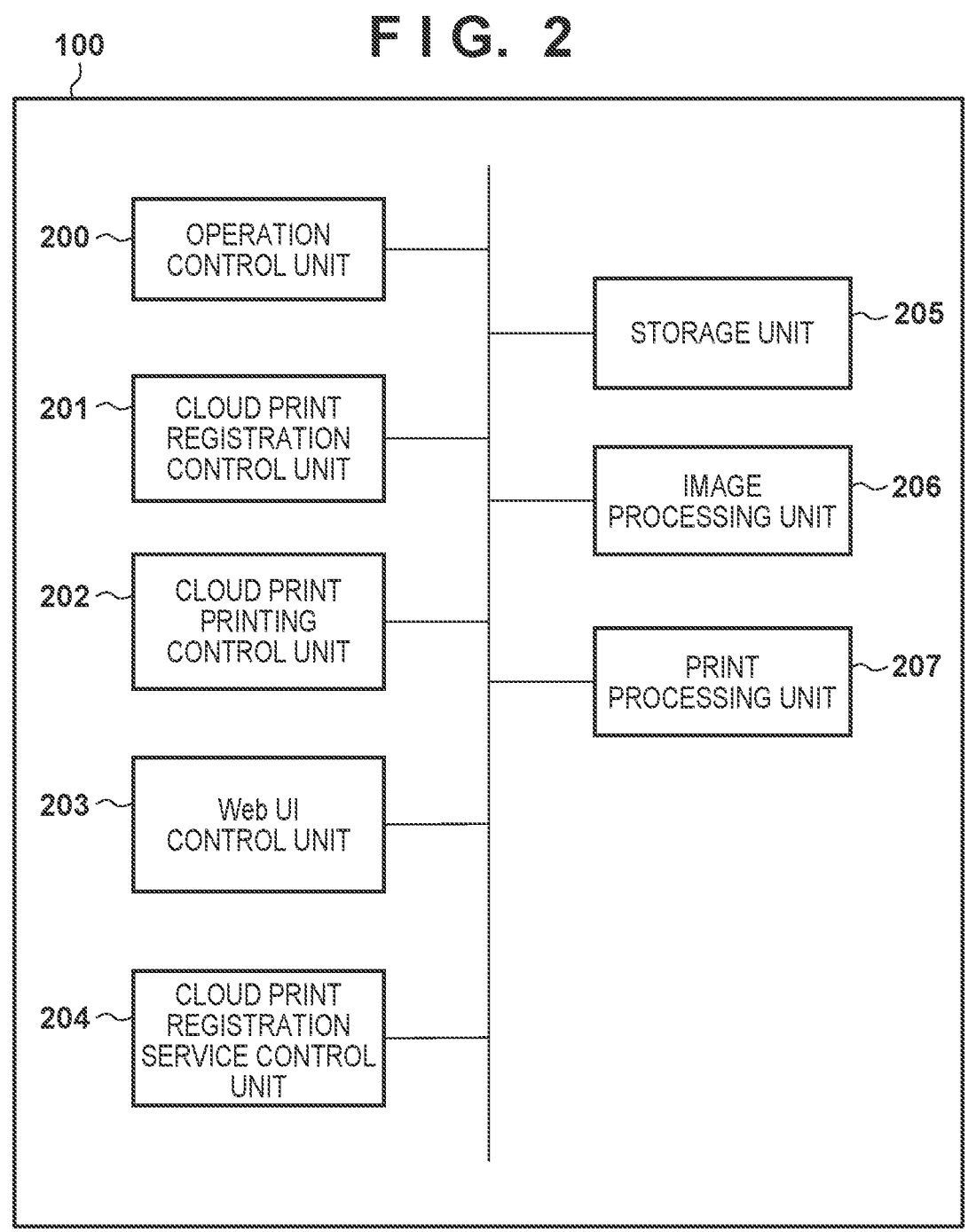
FIG. 2 is a diagram illustrating the software configuration of the printing device according to the present embodiment.

FIG. 2 is a diagram for describing the software configuration of the printing device 100. The functional units illustrated in FIG. 2 are implemented by the CPU 102 including the printing device 100 executing a control program.

An operation control unit 200 controls the operation panel 111. The operation control unit 200 displays an operation menu on the operation panel 111, receives the input of an instruction from a user, notifies other functional units of the contents of the received instruction, and displays the instruction result on the operation panel 111.

A cloud print registration control unit 201 controls cloud print registration processing. A cloud print printing control unit 202 controls processing to issue a print instruction to an image processing unit 206 and transfer print data received from a cloud print printing service 430 (see FIG. 4).

A web UI control unit 203 controls the web UI with which a user uses HTTP to perform device setting operations from a Web browser of an information processing device such as a personal computer (PC) or the like.

A cloud print registration service control unit 204 communicates with a registration utility described below and controls the cloud print automatic registration processing. Note that the registration utility in the present embodiment is software, with this function being implemented by the software being executed by an information processing device such as a computer or the like.

A storage unit 205, in response to an instruction from another functional unit, stores specified data in the ROM 104 or the HDD 114 or reads out stored data. An example of data managed by the storage unit 205 includes registered cloud printer information.

The image processing unit 206 executes processing to render the print job into image data for printing. The image processing unit 206 may also execute other necessary image processing. A print processing unit 207 executes processing to transmit, via the printer I/F 106, the image data rendered by the image processing unit 206 to a printer 107 as an image signal and print.

Figure 3:
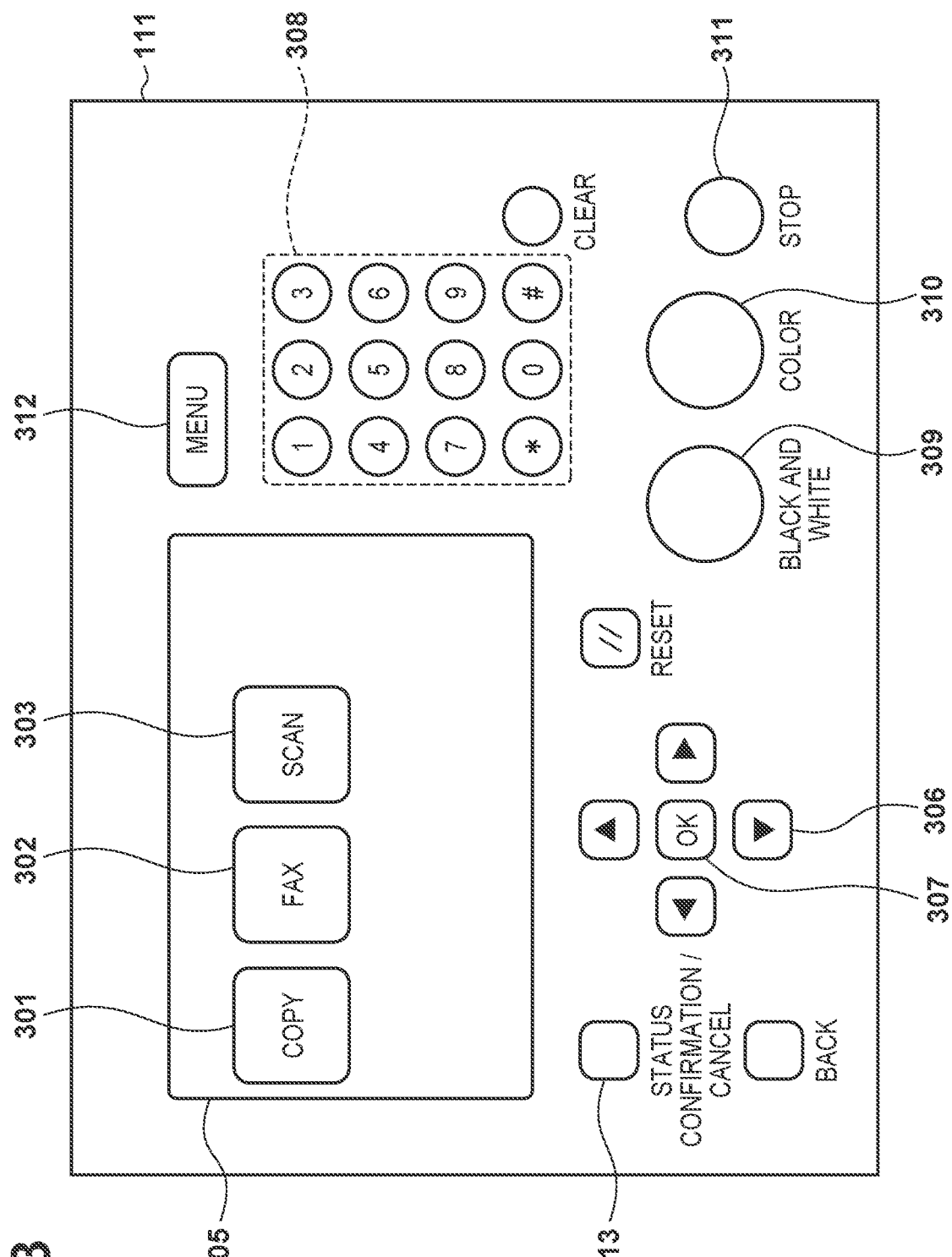
FIG. 3 is an explanatory diagram of an operation panel of the printing device according to the present embodiment.

FIG. 3 is a diagram for describing the operation panel 111 of the printing device 100. A display panel 305 is a touch panel utilizing an LCD or the like and a touch sensor. A copy button 301 is a button that is touched to perform copying using the printing device 100, and by touching the copy button 301, a copy operation screen is displayed on the display panel 305. A fax button 302 is a button that is touched to send a fax using the printing device 100, and by touching the fax button 302, a fax operation screen is displayed on the display panel 305. A scan button 303 is a button that is touched to perform scanning using the printing device 100, and by touching the scan button 303, a scan operation screen is displayed on the display panel 305. A tenkey 308 is used to input numbers and the like. An OK key 307 is used when confirming display contents of the display panel 305. A directional key 306 is used when selecting a menu or the like displayed on the display panel 305. A black and white copy button 309 and color copy button 310 are used to perform black and white copying and color copying, respectively. A stop key 311 is used to stop processing. A menu key 312 is used to display a menu screen for setting the settings of the printing device 100. A status confirmation/cancel key 313 is used to display a list of print jobs received by the printing device 100 and to confirm the status of the printing device 100. The status confirmation/cancel key 313 is also used to cancel an operation and the like.

Network Configuration

FIG. 4 is a network configuration diagram according to the first embodiment. In FIG. 4, a Local Area Network (LAN) 402 connects the printing device 100, printing devices 411, 412, and a client computer 410, and these devices communicate with one another via the LAN 402. The client computer may also be referred to as a client terminal, a client device, or the like. A registration utility 401 is an application software that runs on the client computer 410, i.e., a PC or the like. The client computer 410 is an information processing device that functions as a client terminal of a server of a cloud print registration service 420, the cloud print printing service 430, and the like. The client computer 410 can also execute other functions such as print job creation and the like.

The cloud print registration service 420 and the cloud print printing service 430 exist on an Internet 404. As illustrated schematically in the diagram, each service (i.e., the server or service providing device executing them) may be disposed in the LAN connected to the Internet 404 via an access line. The LAN 402 and the Internet 404 are connected via a firewall 403. The registration utility 401 communicates with the cloud print registration service 420 and the cloud print printing service 430 via the firewall 403.

Next, the operations of the printing device 100, the registration utility, and the like when executing cloud print registration using the printing device 100 with such a configuration will be described using three embodiments. Note that the configuration of the computer executing the registration utility and the various services is the same as the control unit 101 with the configuration illustrated in FIG. 1 plus a user interface device. However, the printer I/F and the scanner I/F may be a general-purpose interface such as Universal Serial Bus (USB). Also, the added user interface device may be provided with a keyboard, a pointing device, a display, or a touch panel instead of these, for example. Note that hereinafter, the registration utility and services are treated as objects, and reference to the client computer or server computer implementing these will be omitted.

First Embodiment

In the first embodiment, the registration utility and the printing device 100 operate in cooperation to automatically register the printing device in a cloud print service. The registration utility is executed by a computer, as described above. Thus, hereinafter, the registration utility is described as an object executed by a computer, and the registration utility in the description below can be understood as a computer executing this. Note that the cloud print service indicates a service that provides a cloud printing function including the cloud print registration service 420 and the cloud print printing service 430. The cloud print service may incorporate these two services or may be a service in which these two services are merged.

Registration Utility Screen

Figure 5A:
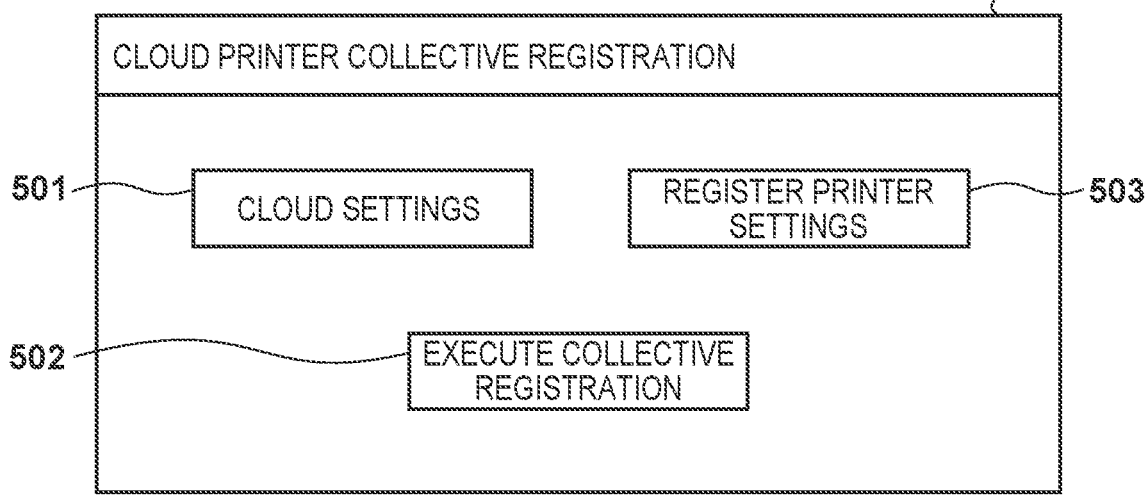
FIGS. 5A to 5C are diagrams of UIs for setting the settings of a registration utility according to the first embodiment.
Figure 5B:
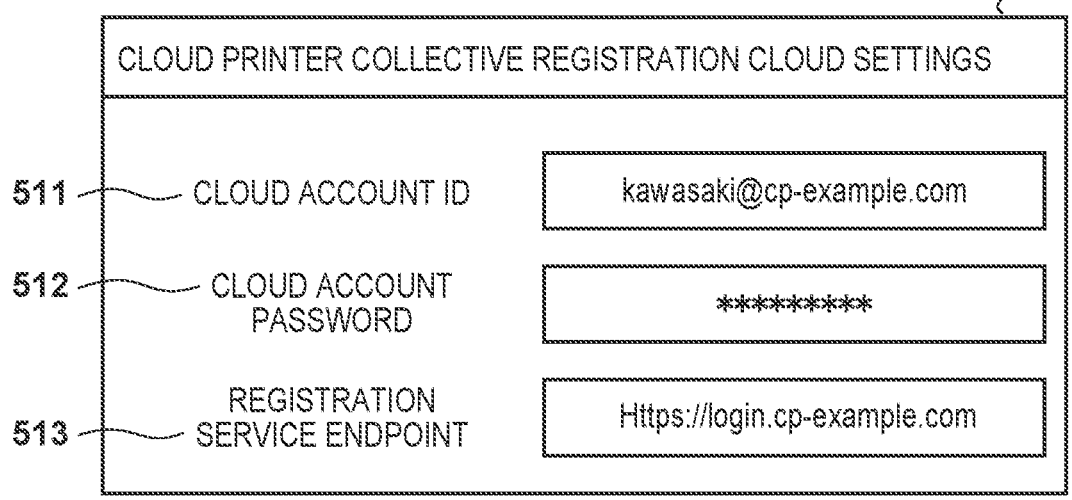
Figure 5C:
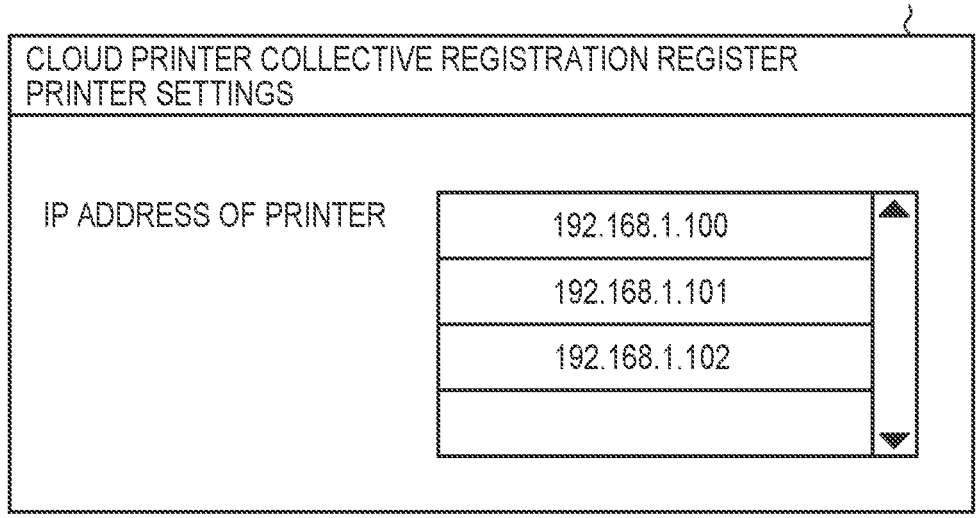

FIGS. 5A to 5C are diagrams of UIs for setting the settings of the registration utility according to the first embodiment. A top screen 500 is the initial screen displayed when the registration utility is executed. When a cloud settings button 501 is pressed, the screen transitions to a cloud settings screen 510. When a register printer settings button 503 is pressed, the screen transitions to a register printer settings screen 520. When an execute collective registration button 502 is pressed, cloud printer registration is executed in accordance with the set contents. Note that for a user interface using a touch panel, press and touch have the same meaning.

In the cloud settings screen 510, the settings of the cloud account executing cloud printer registration are set. Specifically, a cloud account ID 511 and a cloud account password 512 are set. Also, a registration service endpoint 513, which is the endpoint of the cloud print registration service for when cloud print registration is executed, is set. These values may be values acquired from the cloud registration service when registering an account.

In the register printer settings screen 520, an IP address of the printer executing cloud printer registration is set. Here, a plurality of printers can be set, allowing cloud printer registration to be executed collectively. The IP address may be separated acquired and set, or, for example, the IP address may be requested via a multicast transmission with a printer connected to the network as its transmission destination and acquired. Note that the registration process will be described below with reference to FIG. 7 and the like.

Printing Device Screen

Figure 6:
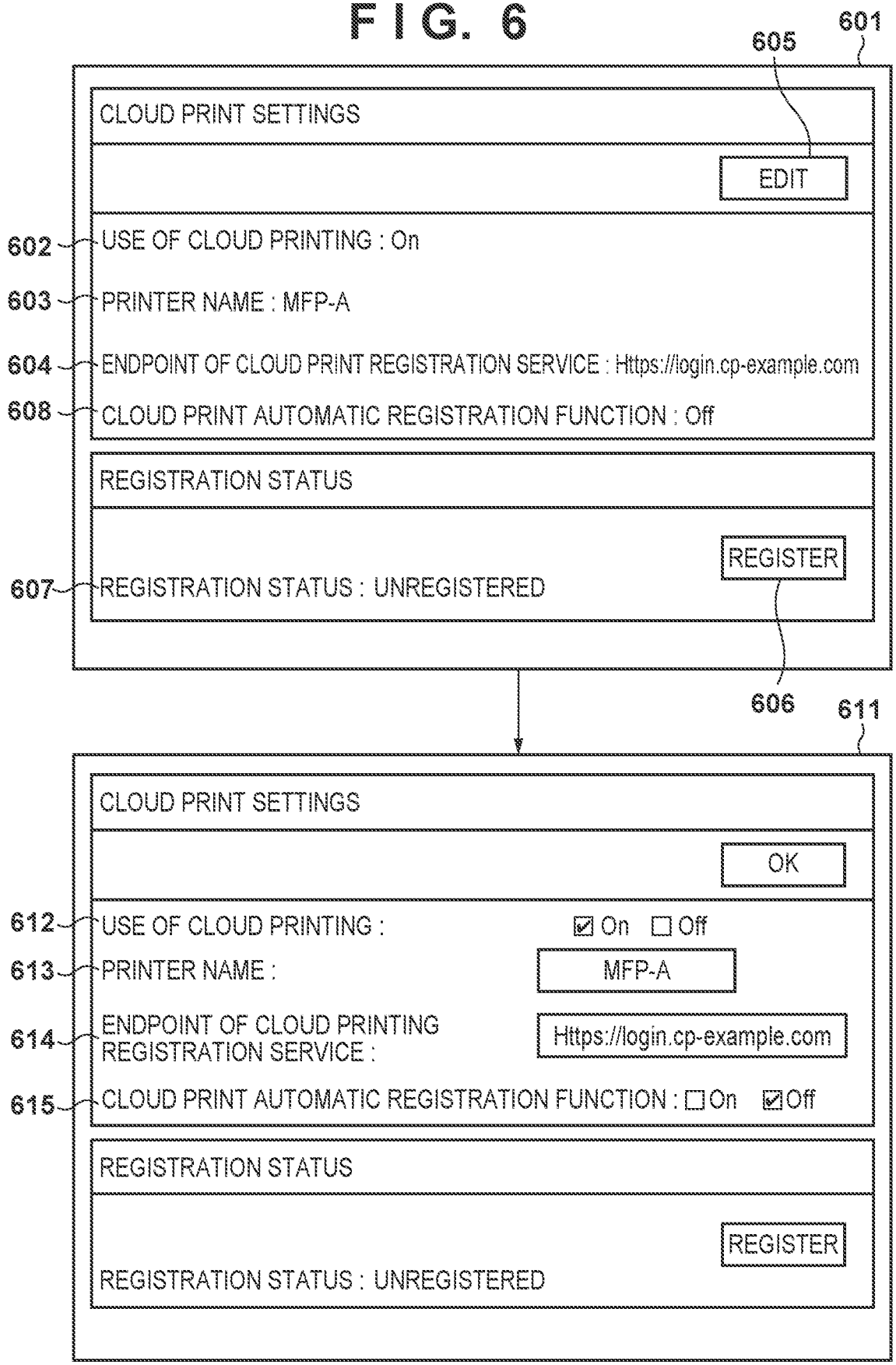
FIG. 6 is a diagram illustrating a cloud print settings UI of a printing device according to the first embodiment.

FIG. 6 is a diagram illustrating a UI for setting cloud print settings of the printing device 100 according to the first embodiment. A cloud print settings screen 601 of FIG. 6 is a screen for registering and setting the settings for cloud printing of the printing device 100 according to the first embodiment. A cloud printing function 602 indicates a cloud printing function on/off setting. A printer name 603 indicates the printer name to be registered for cloud printing. An endpoint 604 indicates an endpoint of the cloud print registration service 420. An automatic registration function 608 indicates whether the cloud print automatic registration function is on or off. The cloud print automatic registration function is a function for registering, with the cloud print service, the printing device 100 via the registration utility without an operation of the printing device 100. When the cloud print automatic registration function is on, the process of FIG. 9 described below is executed by the printing device 100, and the printing device 100 can be registered with the cloud print service.

When an edit button 605 is pressed, the screen transitions to a cloud print change settings screen 611. On the change settings screen 611, the various settings described above can be edited. When a registration button 606 is pressed, cloud print registration is started. A registration status 607 indicates whether or not the printing device 100 is registered with the cloud print service. In a case where it is not registered, "unregistered" is displayed, and in a case where it is registered, "registered" is displayed.

The change settings screen 611 is a screen for changing the settings of cloud printing of the printing device 100 in the first embodiment. In a cloud print function settings 612, the on/off status of cloud printing can be changed. By switching the cloud print function settings 612 to on or off, cloud printing is switched between an enabled state (on) and a disabled state (off).

In a printer name setting 613, the printer name to be registered for cloud printing can be changed.

In an endpoint setting 614, the endpoint of the cloud print registration service 420 can be changed. In an automatic registration function setting 615, the settings for the cloud print automatic registration function can be changed to on or off. As described below, by turning this function on, the printing device 100 and the registration utility 401 cooperate to register the cloud printer.

Registration Sequence by Automatic Registration Function

Figure 7:
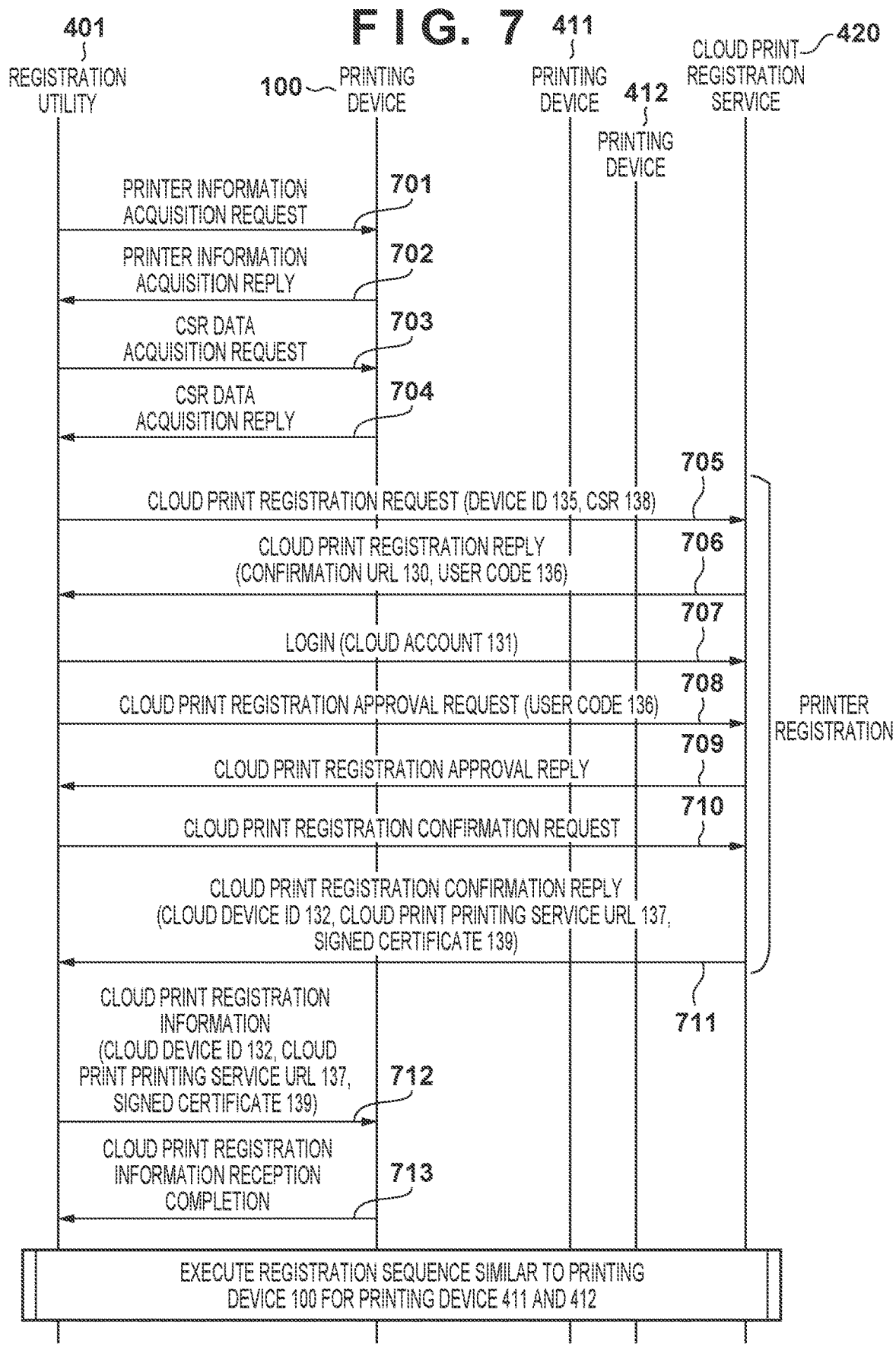
FIG. 7 is a diagram of a sequence between the registration utility, the printing device, and a cloud service according to the first embodiment.

FIG. 7 is a diagram of a sequence between the registration utility, the printing device, and the cloud service according to the first embodiment. Here, the cloud print automatic registration function of the printing device is set to on.

The registration utility 401 transmits a printer information acquisition request 701 to the printing device 100. This transmission may be executed in response to the execute collective registration button 502 in FIG. 5A being touched. Also, the IP address of the printing device 100 which is the transmission destination may be one selected from the IP addresses set in the register printer settings screen 520 in FIG. 5C in a predetermined order.

The printing device 100 transmits a printer information acquisition reply 702 including printer information to the registration utility 401. A specific example of the communication method used here is Get-Printer-Attributes of the Internet Printing Protocol (IPP). The acquired printer information includes a device ID 135, which is identification information for the printing device. Herein, the printer information may also be referred to as device information.

The registration utility 401 transmits a CSR data acquisition request 703 to the printing device 100. The printing device 100 generates a pair of keys, a private key and a public key, used in communications with the cloud print service. Also, the printing device 100 generates Certificate Signing Request (CSR) data including the generated public key, information for identifying the applicant, and signature data. The CSR data is data conforming to the message format of the certificate signing request sent, to a certification authority, from an applicant in order to apply for a public key certificate. The information for identifying the applicant included in the CSR includes a common name, organization name, department name, address, and country number. The printing device 100 uses the printer name "MFP-A" as its common name. For the organization name, department name, address, country number, the default values stored at the time of factory shipping of the printing device 100 is used. The signature data is data corresponding to the public key and a hash value of identifying information constituting the CSR data signed by the private key. For the format of the CSR data, for example, PKCS #10 or a similar format may be used. For example, the printing device 100 uses the generated private key and signs the information to be used in the access token acquisition process. In this manner, falsification of information on this communication path can be prevented.

The printing device 100 transmits a CSR data acquisition reply 704 to the registration utility 401. The CSR data acquisition reply 704 includes CSR data 138 generated by the printing device 100.

The registration utility 401 transmits a cloud print registration request 705 to the cloud print registration service 420. The transmission destination may be the registration service endpoint set in the cloud settings screen 510. The cloud print registration request 705 includes the device ID 135 for the cloud print registration service 420 to identify the printing device 100 and the CSR data 138. Hereinafter, the CSR data may also be referred to as simply CSR 138. The device ID 135 is acquired by the registration utility 401 from the printing device 100 via the printer information acquisition reply 702. As described above, the CSR 138 includes the public key of the printing device 100. The CSR 138 is a message requesting the cloud print registration service 420, i.e., the certification authority, to issue a signed certificate. By attaching a signed certificate to the print data with the signature, the validity of the public key to be used in decoding the electronic signature using the private key of the printing device 100, i.e., the authenticity of whether the public key corresponds to the private key used by the printing device 100, can be assured. Also, because the signed certificate is given to the printing device 100 and used as a token, for example, authentication when accessing the cloud print printing service 430 can be made simple. The signed certificate is a so-called client certificate.

When the cloud print registration service 420 receives the cloud print registration request 705, the cloud print registration service 420 transmits a cloud print registration reply 706 including a confirmation URL 130 and a user code 136 for cloud print registration to the registration utility 401.

The registration utility 401 accesses the received confirmation URL 130 and executes login 707 using a cloud account 131 (including an account ID and a password). Here, the registration utility 401 displays the cloud settings screen 510 of FIG. 5B and transmits the entered cloud account ID and cloud account password as the cloud account 131.

Next, the registration utility 401 transmits a cloud print registration approval request 708 including the user code 136 to the cloud print registration service 420. The user code 136 is one received via the cloud print registration reply 706. When the cloud print registration service 420 receives the cloud print registration approval request 708, a cloud print registration approval reply 709 is transmitted to the registration utility 401, if approval can be given. For example, in a case where the received user code and the transmitted user code are different, approval may not be given.

The registration utility 401 having received the cloud print registration approval reply 709 transmits a cloud print registration confirmation request 710 to the cloud print registration service 420. When the cloud print registration service 420 receives the cloud print registration confirmation request 710, a cloud print registration confirmation reply 711 is transmitted to the registration utility 401. The cloud print registration confirmation reply 711 includes a cloud device ID 132 assigned to the registered printing device 100, a cloud print printing service URL 137 corresponding to the address of the access destination when acquiring the print data, and a signed certificate 139. The signed certificate 139 may be for the CSR 138. This information may be referred to as cloud print registration information (or simply as registration information) and is information that is necessary for the printing device 100 to access the cloud print printing service 430. The acquired signed certificate 139 is used for the printing device 100 to generate an access token. Also, this access token is used when the printing device 100 communicates with the cloud print printing service 430. Specifically, the access token is used by being set as authentication information in the header of a HTTP request transmitted by the printing device 100. The cloud print printing service 430, having received the access token, for example, receives a message including the access token as a message from an authenticated sender and can execute processing.

The registration utility 401 having received the cloud print registration confirmation reply 711 transmits cloud print registration information 712 to the printing device 100. The cloud print registration information 712 includes the cloud device ID 132, the cloud print printing service URL 137, and the signed certificate 139 received via the cloud print registration confirmation reply 711. The printing device 100 having received this stores the cloud device ID 132, the cloud print printing service URL 137, and the signed certificate 139 in a predetermined storage area for each and transmits a cloud print registration information reception completion 713 to the registration utility 401. This information is used for the printing device 100 to access the cloud print printing service 430 and acquire the print data.

Here, the cloud print registration of the printing device 100 is complete. The registration utility 401 may then sequentially execute the processing from transmission of the printer information acquisition request 701 to transmission of the cloud print registration information 712 for both the printing devices 411, 412 set as register printers.

Printing Process

Next, the cloud printing process executed by the registered printing device 100 will be simply explained. First, a print job such as document data generated by the client device or the like is registered with the cloud print printing service 430. In this registration, the cloud device ID of the printing device executing the printing is also transmitted to the cloud print printing service 430 and held associated with the print job.

Then, in response to the operation by an operator, the cloud device ID and a print job request including the print data is transmitted to the cloud print printing service 430 from the printing device 100. Here, the operator has the authority to transmit the print job request to the cloud print printing service 430. This authority may be the same as the authority necessary for cloud printer collective registration, for example.

In response to the print job request, the cloud print printing service 430 transmits, to the printing device 100, a list of the print jobs associated with the cloud device ID of the print job, for example. The printing device 100 transmits, to the cloud print printing service 430, the request for the print job selected by the operator or the like from this list. In response to this, the print job transmitted from the cloud print printing service 430 to the printing device 100 is executed by the printing device 100, and the received print data is printed and output.

Of course, this is just an example, and the transmission of the list of print jobs in response to the print job request may be omitted, or all of the relevant print jobs may be transmitted to the printing device 100, for example. Also, a process of authenticating the operator may be added before operation of the printing device 100.

Registration Process by Registration Utility 401

Figure 8:
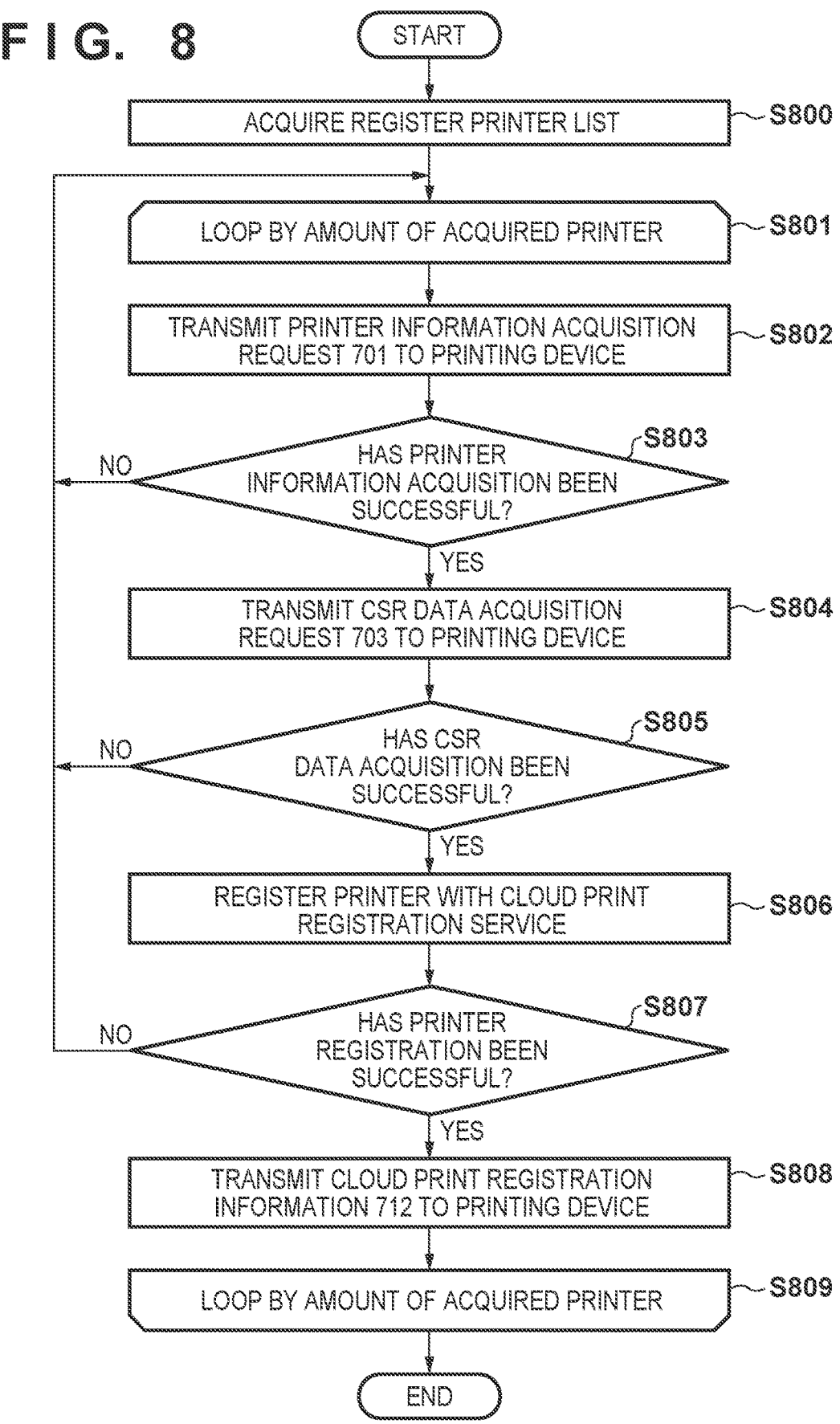
FIG. 8 is a flowchart of when registration is executed by the registration utility according to the first embodiment.

FIG. 8 is a flowchart of when registration is executed by the registration utility 401 according to the first embodiment. The flow can be implemented by a CPU or processor of a general-purpose computer executing a program according to the flow, for example. Note that the CPU or processor and the communication interface of the general-purpose computer cooperate to execute the data transmission and reception processing.

In step S800, the registration utility 401 acquires a register printer list. The register printer list is a list of printers set in the register printer settings screen 520, which is an operation screen of the registration utility 401. The registration utility 401 executes the processing from step S801 to step S809 for each acquired printer. Step S801 to step S809 represent the start and end of a loop, and the contents indicate an execution condition for the loop.

In step S802, the registration utility 401 transmits the printer information acquisition request 701 to the printing device 100.

In step S803, the registration utility 401 determines whether or not printer information acquisition has been successful. In a case where it is not successful, the process returns to step S801, and the processing is executed for the next printer.

In a case where it is successful, in step S804, the registration utility 401 transmits the CSR data acquisition request 703 to the printing device 100.

In step S805, the registration utility 401 determines whether or not CSR data acquisition has been successful. In a case where it is not successful, the process returns to step S801, and the processing is executed for the next printer.

In a case where it is successful, in step S806, the registration utility 401 registers the printer with the cloud print registration service 420. Here, registering a printer corresponds specifically to the processing illustrated in FIG. 7 from transmission of the cloud print registration request 705 to reception of the cloud print registration confirmation reply 711.

In step S807, the registration utility 401 determines whether or not printer registration has been successful. In a case where it is not successful, the process returns to step S801, and the processing is executed for the next printer. Unsuccessful registration may mean that a reply indicating a failure has been received in response to any of the messages transmitted to the cloud print registration service 420. In this case, the failed message may be resent a predetermined number of times, and if the attempt is still unsuccessful, the process ends with an error and this is communicated to the operator.

In a case where printer registration is successful, that is the cloud print registration confirmation reply 711 has been received, in step S808, the registration utility 401 transmits the cloud print registration information 712 to the printing device 100. With the processing from step S802 to step S808 executed once, the registration of one printer is completed.

Then, the registration utility 401 determines whether registration processing for the printers in the acquired printer list has been completed. In a case where unregistered printers remain on the printer list, the process returns to step S801, and the processing from step S802 is repeated for the next printer. When registration processing is completed for all of the printers on the acquired printer list, the processing ends.

Figure 9:
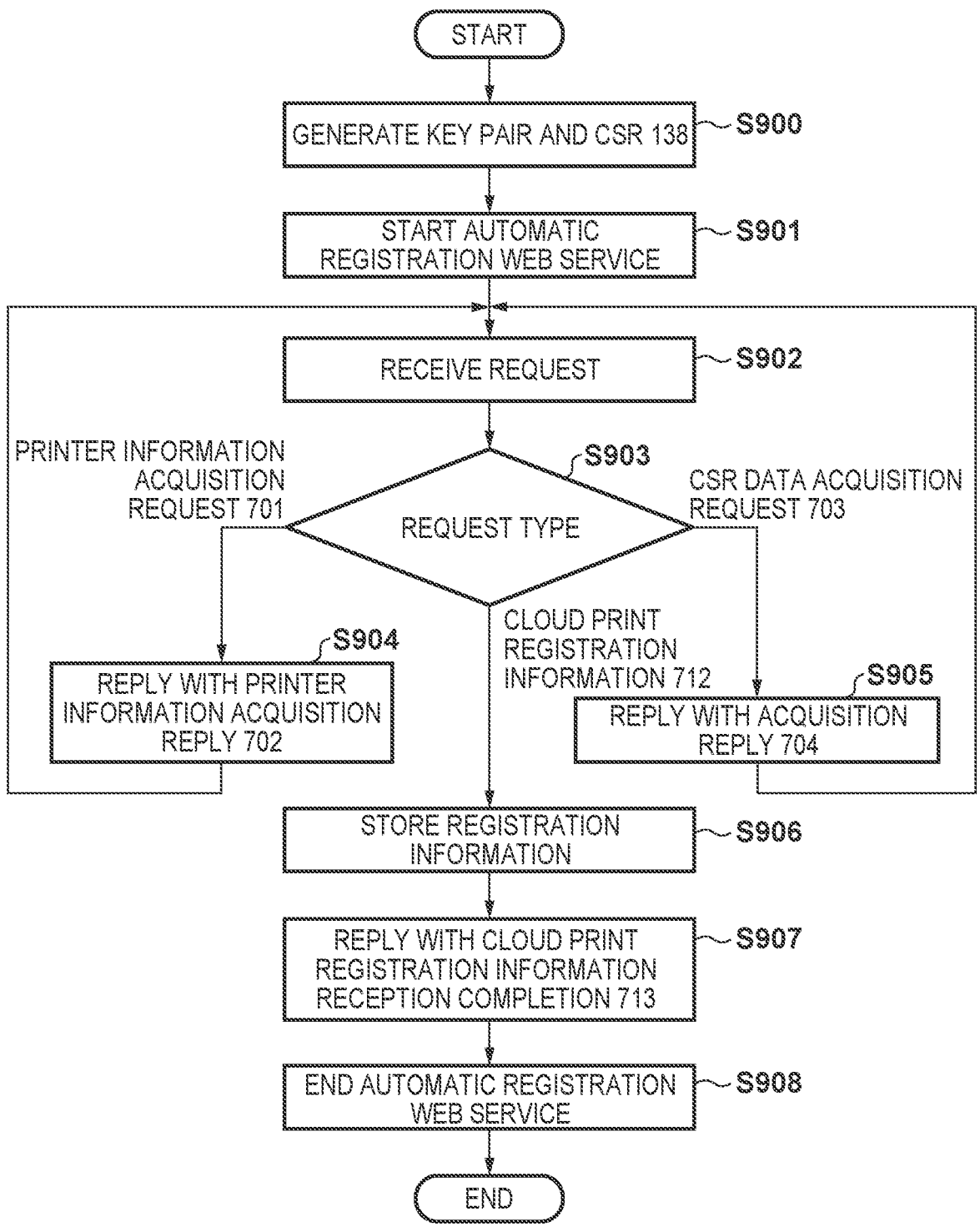

Processing by Printing Device when Cloud Print Automatic Registration Function is On FIG. 9 is a flowchart of when the cloud print automatic registration function (also referred to as the web automatic registration function) of the cloud printing setting of the printing device 100 according to the first embodiment is on. This processing is executed by a CPU 102 of the printing device 100, for example. Note that the CPU 102 cooperates with the network I/F 112 to implement the data transmission and reception processing. Note that when registering one printing device with a plurality of cloud printing services, for example, the automatic registration function setting may be set for each service, and the processing of FIG. 9 may be executed when that setting is set to on.

In step S900, the cloud print registration service control unit 204 generates the key pair of the private key and the public key and generates the CSR data 138 including the generated public key, the applicant information, and the signature data. Note that the key pair may be provided from an authentication server, for example.

In step S901, the cloud print registration service control unit 204 starts the automatic registration web service (hereinafter, referred to as web service). This web service is a service for the printing device 100 to receive the printer information acquisition request 701, the CSR data acquisition request 703, and the cloud print registration information 712.

In step S902, the cloud print registration service control unit 204 receives a request. In step S903, the cloud print registration service control unit 204 determines the type of the received request.

In a case where the received request is the printer information acquisition request 701, in step S904, the cloud print registration service control unit 204 replies with the printer information acquisition reply 702 including the printer information and returns to step S902 in a request reception standby state.

In a case where the received request is the CSR data acquisition request 703, in step S905, the cloud print registration service control unit 204 replies with the CSR data acquisition reply 704 including the CSR data 138 and returns to step S902 in a request reception standby state.

In a case where the received request is the cloud print registration information 712, in step S906, the cloud print registration service control unit 204 stores the received registration information in the storage unit 205. The stored registration information includes the cloud device ID, the cloud print printing service URL, and the signed certificate.

In step S907, the cloud print registration service control unit 204 replies with the cloud print registration information reception completion 713.

In step S908, the cloud print registration service control unit 204 ends the automatic registration web service.

With the process described above, a plurality of printing devices can be registered with a cloud print registration service by executing the registration utility 401. Here, in a case where the printing device to be registered includes a function corresponding to the registration utility, by setting the use of cloud printing in advance, the printing device can be registered with the cloud printing service. Also, regarding the operations when registering, a plurality of printing devices can be collectively registered, without needing to log in to the cloud print registration service for each printing device. Also, during registration, the printing device only needs to be connected to the computer executing the registration utility to register, and there is no need to communicate with the cloud print registration service or the cloud print printing service. Furthermore, after registration, each of the printing devices can acquire and execute the print jobs provided by the cloud print printing service.

Note that in the present embodiment, the printer information and the CSR data are separately acquired, however no such limitation is intended. For example, a configuration may be used in which the printer information and the CSR data are collectively acquired. Also, the cloud print registration service 420 and the cloud print printing service 430 may be executed by the same server.

Second Embodiment

The registration utility 401 is capable of using the Internet Printing Protocol (IPP) for acquiring the printer information of the printing device 100 via the printer information acquisition request 701. The IPP is a widely supported protocol for printing devices. In the second embodiment, a printing device 100 that supports the IPP is capable of acquiring the printer information of the printing device 100 using the IPP.

Processing by Printing Device when Cloud Print Registering (IPP Supported)

Figure 10:
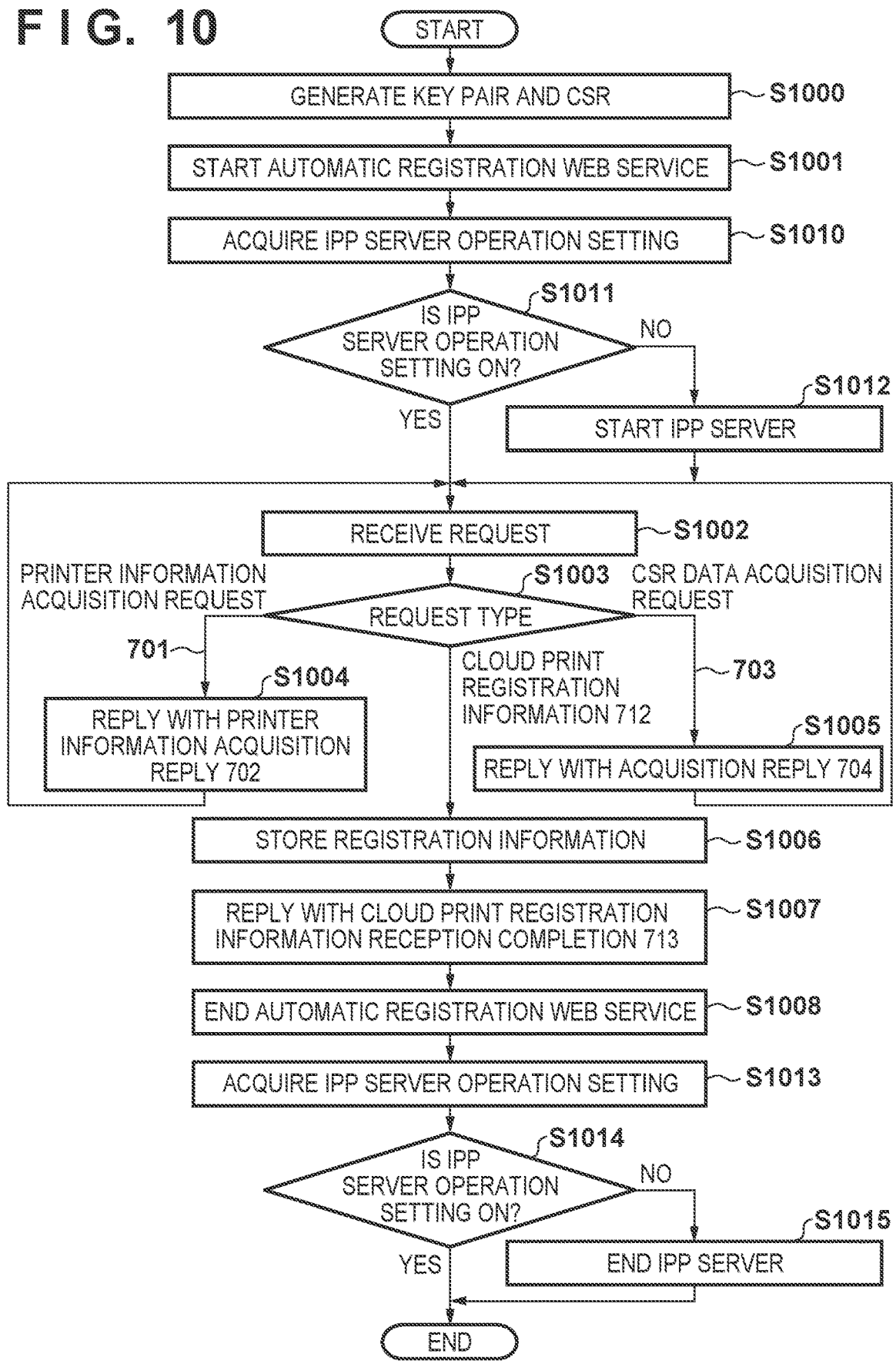

FIG. 10 is a flowchart of when the cloud print automatic registration function of the cloud print setting of the printing device 100 according to the second embodiment is on.

In step S1000, the cloud print registration service control unit 204 generates the key pair of the private key and the public key and generates the CSR data including the generated public key, the applicant information, and the signature data. In step S1001, the cloud print registration service control unit 204 starts the automatic registration web service.

In step S1010, the cloud print registration service control unit 204 acquires an IPP server operation setting from the storage unit 205. In step S1011, the cloud print registration service control unit 204 determines whether or not the setting is on from the IPP server operation setting acquired in step S1010. In a case where it is not on, or in other words when the setting is set so that the IPP server is not in operation, the IPP server is not in operation, and so in step S1012 the IPP server is started. In a case where it is on, or in other words when the setting is set so that the IPP server is in operation, the IPP server is in operation, and so the process proceeds to step S1002.

In step S1002, the cloud print registration service control unit 204 receives a request. Depending on the type of request, the processing can be executed by the IPP server.

In step S1003, the cloud print registration service control unit 204 determines the type of the received request. In a case where the received request is the printer information acquisition request 701, in step S904, the cloud print registration service control unit 204 replies with the printer information acquisition reply 702 and returns to step S1002 in a request reception standby state.

In a case where the received request is the CSR data acquisition request 703, in step S1005, the cloud print registration service control unit 204 replies with the CSR data acquisition reply 704 including the CSR data 138 and returns to step S1002 in a request reception standby state.

In a case where the received request is the cloud print registration information 712, in step S1006, the cloud print registration service control unit 204 stores the registration information in the storage unit 205.

In step S1007, the cloud print registration service control unit 204 replies with the cloud print registration information reception completion 713.

In step S1008, the cloud print registration service control unit 204 ends the automatic registration web service.

In step S1013, the cloud print registration service control unit 204 acquires an IPP server operation setting from the storage unit 205.

In step S1014, the cloud print registration service control unit 204 determines whether or not the setting is on from the IPP server operation setting acquired in step S1013. In a case where the setting is not on, the IPP server has not been in operation, and so in step S1015 the IPP server ends. In a case where the setting acquired in step S1013 is on, the IPP server has been in operation, and so the processing ends without ending the IPP server. In other words, after the automatic registration web service ends, the state of the IPP server is returned to the state it was before the automatic registration web service was started.

As described above, the IPP server can be used to execute at least a part of the registration process.

FIG. 11 is a diagram illustrating a specific example of a web service of the printing device 100 according to the second embodiment.

The service implemented by the automatic registration web service is a CSR data providing service that provides CSR data to an external device and a registration information reception service that receives cloud print registration information from an external terminal. The registration utility 401 transmits a request to the CSR data providing service by the HTTP GET method and acquires the CSR 138 as the reply to the request. Also, the registration utility 401 transmits the cloud print registration information including the cloud device ID 132, the cloud print printing service URL 137, and the signed certificate 139 to the reception service of the printing device 100 by the HTTP POST method. The reception service having received the information stores the received registration information in the storage unit 205. Examples of the URIs for these include https://(IP address)/cloudprint/csr data and https://(IP address)/cloudprint/regist-info.

Also, the service implemented by the IPP service is a printer information providing service that provides printer information. For the protocol, IPP is used, and for the operation, the get-printer-attributes operation is used. An example of the URI in this case includes ipp://(IP address)/ipp/print. The registration utility 401 uses the IPP get-printer-attributes request operation to send a request to the printer information providing service of the printing device 100 for the printer information. The providing service replies to the request with the printer information including the device ID. In this example, because the acquisition of the printer information is executed via processing by the IPP server, the printer information acquisition request can be excluded from the request type determination in step S1003. The printer information acquisition request is processed via the IPP and not the process of the automatic registration web service of FIG. 10.

Via the process described above, the IPP server function can be used when registering a printing device with a cloud print service.

Third Embodiment

In the third embodiment, a sharing setting, printer names, and members can be set at the same time when executing printer registration via the registration utility 401.

Shared Printer Automatic Registration

Figure 12A:
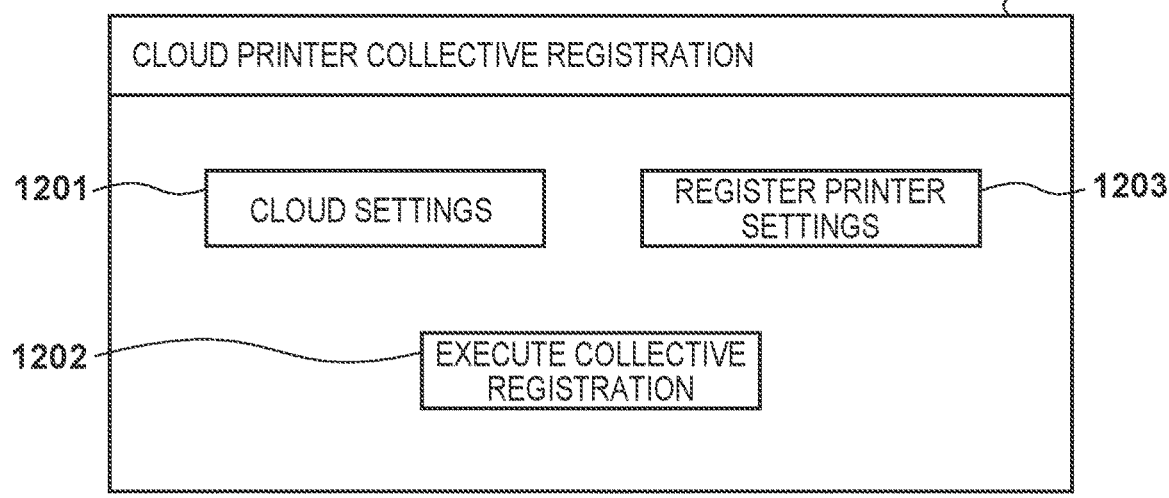
FIGS. 12A to 12C are diagrams of UIs for setting the settings of a registration utility according to a third embodiment.
Figure 12B:
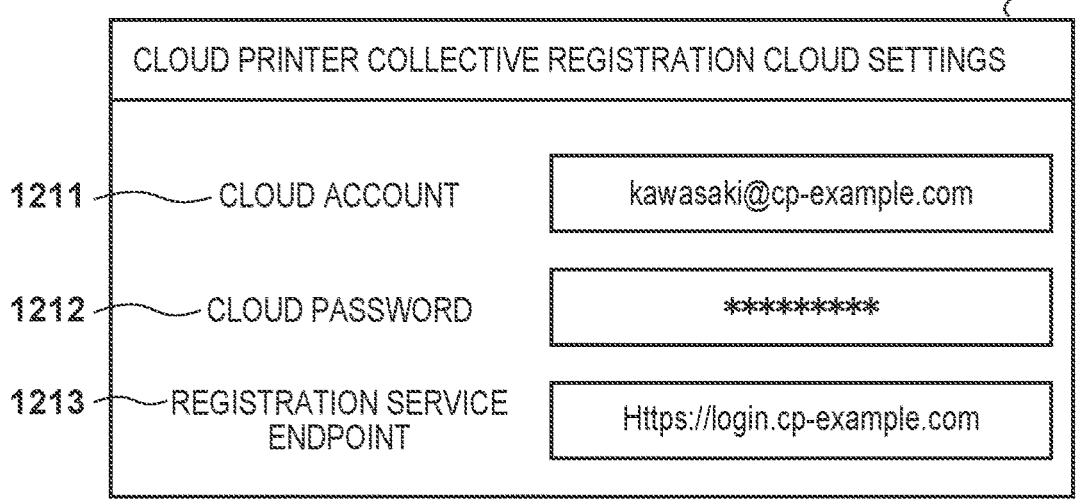
Figure 12C:
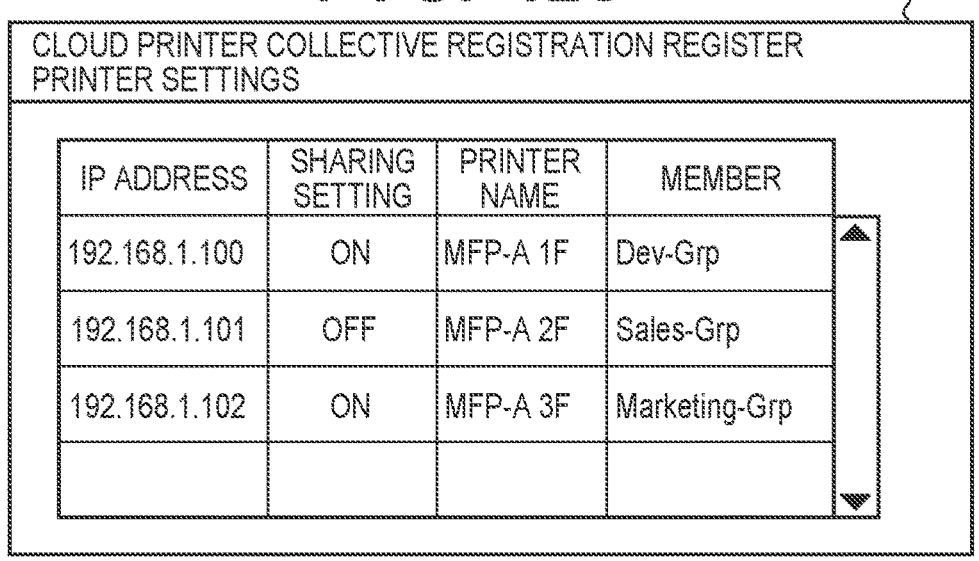

FIGS. 12A to 12C are diagrams of UIs for setting the settings of the registration utility 401 according to the third embodiment. A top screen 1200 of the FIG. 12A is a top screen displayed when the registration utility is started. When a cloud settings button 1201 is pressed, the screen transitions to a cloud settings screen 1210 (FIG. 12B). When a register printer settings button 1203 is pressed, the screen transitions to a register printer settings screen 1220 (FIG. 12C). When an execute collective registration button 1202 is pressed, cloud printer registration is executed in accordance with the set contents. In other words, the registration utility executes the processing illustrated in FIG. 13.

In the cloud settings screen 1210, the settings of the cloud account executing cloud printer registration are set. Specifically, a cloud account ID 1211 and a cloud account password 1212 are set. Also, a registration service endpoint 1213, which is the endpoint of the cloud print registration service for when cloud print registration is executed, is set.

In the register printer settings screen 1220, an IP address of the printer executing cloud printer registration, the sharing setting, printer names, and member are set. Member indicates that it is a member of a group able to use a printer, and, for example, member specifies the group name of the group including the user and not each user name. For example, in the first embodiment, the user able to use the cloud print service with the specified cloud device ID of a printing device is the user who registered the printing device.

However, in the present embodiment, by a printing device with the sharing setting on being registered with the cloud print service, not only is the registered user able to use the printing device, but users who are members of the group associated with the printing device can also use the printing device. Note that members are users with a cloud account. For example, the group name and user ID are associated beforehand when registering with the cloud print printing service 430. The user can specify the printing device they registered as a printing device for printing a downloaded print job and upload the print job to the cloud print printing service 430. In addition, the user can specify a printing device which has the sharing setting, which indicate whether sharing is on or off, set to on (i.e., sharing is allowed) and the group to which the user is a member of associated and can upload the print job to the cloud print printing service 430. Note that in a case where the member setting is performed by specifying each user rather than a group, if, for the printing device, the user using the cloud print printing service is set as a member, the printing device can be used. In this case, associating the group and the user does not need to be registered separately.

In this manner, a plurality of printers can be set together with the sharing setting and the member setting, allowing cloud printer registration to be executed collectively.

Furthermore, the printer names of the printers to be registered can be registered. The registration utility 401 can update the existing printer name with a registered printer name. In a case where the printer name is managed by the registration utility 401, this is updated. Also, in a case where the printer name is registered with the cloud print registration service 420, the printer name may be transmitted to the cloud print registration service 420 where the printer name is updated.

FIG. 13 is a flowchart of when registration is executed by the registration utility 401 according to the third embodiment. Step S1300 to step S1307 and step S1311 to step S1312 are similar to step S801 to step S809 of FIG. 8 of the first embodiment.

In step S1300, the registration utility 401 acquires a register printer list. The register printer list is a list of printers set in the register printer settings screen 1220, which is an operation screen of the registration utility 401.

The registration utility 401 executes the processing from step S1301 to step S1312 for the number of acquired printers.

In step S1302, the registration utility 401 transmits the printer information acquisition request 701 to the printing device 100. Note that in the present embodiment, the acquired printer information includes the device ID as well as the printer name. The model name may also be included.

In step S1303, the registration utility 401 determines whether or not printer information acquisition has been successful. In a case where it is not successful, the process returns to step S1301, and the processing is executed for the next printer.

In a case where it is successful, in step S1304, the registration utility 401 transmits the CSR data acquisition request 703 to the printing device 100.

In step S1305, the registration utility 401 determines whether or not CSR data acquisition has been successful. In a case where it is not successful, the process returns to step S1301, and the processing is executed for the next printer.

In a case where it is successful, in step S1306, the registration utility 401 registers the printer with the cloud print registration service 420. Herein, printer registration corresponds specifically to the processing from 705 to 711 in the sequence of FIG. 7.

In step S1307, the registration utility 401 determines whether or not printer registration has been successful. In a case where it is not successful, the process returns to step S1301, and the processing is executed for the next printer.

In a case where it is successful, the process branches to step S1308. The process from step S1308 to step S1310 is specific to the present embodiment. In step S1308, the registration utility 401 transmits the printer sharing setting of the printer currently being registered to the cloud print registration service 420. At this time, because the transmitted settings are to be associated with the printer in question, the related cloud device ID or the IP address is also transmitted. The cloud print registration service 420 having received this associate the received printer sharing setting with the cloud device ID or the IP address, for example, and registers the setting.

In step S1309, the registration utility 401 transmits the printer name of the printer currently being registered to the cloud print registration service 420. At this time, the related cloud device ID or the IP address is also transmitted. The cloud print registration service 420 having received this associate the received printer name with the cloud device ID or the IP address, for example, and updates the registered printer name.

In step S1310, the registration utility 401 transmits the member of the printer currently being registered to the cloud print registration service 420. At this time, the related cloud device ID or the IP address is also transmitted. The cloud print registration service 420 having received this associate the received member with the cloud device ID or the IP address, for example, and registers the member. The information transmitted in step S1308 to step S1310 may be collectively transmitted in one step.

In step S1311, the registration utility 401 transmits the cloud print registration information 712 to the printing device 100.

In step S1312, the registration utility 401 determines whether the processing of all of printers on the acquired printer list has been completed, and in a case where it is not, the process returns to step S1301 and the processing is repeated for the next printer. When processing is completed for all of the printers on the acquired printer list, the processing ends.

In the present embodiment with the process described above, a plurality of printing devices can be collectively registered as cloud devices and the sharing setting and members sharing a printing device can be registered. Also, the printer name referred to in the cloud print system can be updated with a specified name. In a similar manner to the first embodiment, with the printing device provided with only an automatic registration web service, a plurality of printing devices can be collectively registered via an operation from a client terminal, achieving a similar effect to that of the first embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-186752, filed Nov. 9, 2020 which is hereby incorporated by reference herein in its entirety.

What is claimed is:

1. A printing system including an information processing device, a printing device, and a service providing device that provides a cloud printing service, the information processing device comprising:
   at least one memory that stores a set of instructions; and
   at least one processor that executes the instructions, the instructions, when executed, causing the information processing device to perform operations comprising:
      for one printing device or each of a plurality of printing devices to be registered,
      acquiring device information from the printing device;
      transmitting the device information acquired to the service providing device and registering the device information acquired;
      receiving registration information, from the service providing device, for the printing device registered to access the service providing device, the registration information including an address of the cloud printing service provided by the service providing device and a signed certificate; and
      transmitting the registration information received to the printing device,
      wherein the printing device of which the device information has been registered with the service providing device accesses the service providing device using the registration information to acquire a print job held by the service providing device and execute the acquired job.

2. An information processing device that communicates with a printing device and a service providing device that provides a cloud printing service, the information processing device comprising:
   at least one memory that stores a set of instructions; and
   at least one processor that executes the instructions, the instructions, when executed, causing the information processing device to perform operations comprising:
      for one printing device or each of a plurality of printing devices to be registered,
      acquiring device information from the printing device;
      transmitting the device information acquired to the service providing device and registering the device information acquired;
      receiving registration information, from the service providing device, for the printing device registered to access the service providing device;
      transmitting the registration information received to the printing device and storing the registration information received; and
      wherein the printing device registered with the service providing device acquires a print job held by the service providing device using the registration information and executes the acquired job.

3. A control method for controlling an information processing device that communicates with a printing device and a service providing device that provides a cloud printing service, the control method comprising:
   for one printing device or each of a plurality of printing devices to be registered,
   acquiring device information from the printing device;
   transmitting the device information acquired to the service providing device and registering the device information acquired;
   receiving registration information, from the service providing device, for the printing device registered to access the service providing device;
   transmitting the registration information received to the printing device and storing the registration information received; and
   wherein the printing device registered with the service providing device acquires a print job held by the service providing device using the registration information and executes the acquired job.

4. The control method according to claim 3, wherein the device information includes a device ID of the printing device and a certificate signing request for certifying validity of a public key corresponding to a private key used by the printing device.

5. The control method according to claim 4, wherein the registration information includes a cloud device ID assigned to the printing device by the service providing device, an address for accessing the service providing device, and a signed certificate corresponding to the certificate signing request.

6. The control method according to claim 3, further comprising
   entering a sharing setting for allowing a plurality of users to share the printing device;
   for one printing device or each one of a plurality of printing devices to be registered, further transmitting the sharing setting to the service providing device, associating the sharing setting with the printing device, and storing the sharing setting; and
   via the service providing device, holding a print job of the plurality of users set via the sharing setting and allowing the printing device associated with the print job to acquire the print job.

7. The control method according to claim 6, wherein the sharing setting includes whether sharing is on or off and sharing members.

8. The control method according to claim 3, further comprising
   entering a name for the printing device; and
   for one printing device or each of a plurality of printing devices to be registered, further transmitting the name to the service providing device and registering the name as a new name for the printing device.

9. A non-transitory computer-readable medium stored in one or more programs, the one or more programs, when executed by a computer able to communicate with a printing device and a service providing device that provides a cloud printing service, causes the computer to:
   for one printing device or each of a plurality of printing devices to be registered,
   acquire device information from the printing device;
   transmit the device information acquired to the service providing device and register the device information acquired;
   receive registration information, from the service providing device, for the printing device registered to access the service providing device; and
   transmit the registration information received to the printing device and store the registration information received;
   wherein the printing device registered with the service providing device, acquires a print job held by the service providing device using the registration information and executes the acquired job.

10. A printing device forming a printing system with an information processing device and a service providing device that provides a cloud printing service, the printing device comprising:

at least one memory that stores a set of instructions; and
at least one processor that executes the instructions, the instructions, when executed, causing the printing device to perform operations comprising:
   transmitting device information in response to a request from the information processing device; and
   receiving registration information from the information processing device and storing the registration information;
   wherein the printing device registered with the service providing device acquires a print job held by the service providing device using the registration information and executes the acquired job.

11. The printing device according to claim 10, wherein the device information includes a device ID of the printing device and a certificate signing request for certifying validity of a public key corresponding to a private key used by the printing device.

12. The printing device according to claim 11, wherein the registration information includes a cloud device ID assigned to the printing device by the service providing device, an address for accessing the service providing device, and a signed certificate corresponding to the certificate signing request.

13. The printing device according to claim 11, wherein the operations further comprise
   executing an automatic registration web service, transmitting the device information to the information processing device via the automatic registration web service, receiving and storing the registration information, and ending the automatic registration web service.

14. The printing device according to claim 13, wherein the operations further comprise
   in a case where Internet Printing Protocol (IPP) is supported, when the automatic registration web service is started, if an IPP server is not active, the IPP server is activated; the device information is transmitted to the IPP server; and after the automatic registration web service ends, a state of the IPP server is returned to a state before the automatic registration web service started.

15. The printing system according to claim 1, wherein the information processing device and the printing device are connected by a local area network and the service providing device and the printing device are connected via the Internet.

* * * * *